US009356826B2

(12) United States Patent
Palazzolo et al.

(10) Patent No.: US 9,356,826 B2
(45) Date of Patent: May 31, 2016

(54) CONNECTING NETWORK MANAGEMENT SYSTEMS

(71) Applicants: Patrice Palazzolo, Nice (FR); Laurent Chavanis, Nice (FR)

(72) Inventors: Patrice Palazzolo, Nice (FR); Laurent Chavanis, Nice (FR)

(73) Assignee: SAP SE, Walldorf (DE)

( * ) Notice: Subject to any disclaimer, the term of this patent is extended or adjusted under 35 U.S.C. 154(b) by 669 days.

(21) Appl. No.: 13/723,405

(22) Filed: Dec. 21, 2012

(65) Prior Publication Data

US 2014/0181281 A1    Jun. 26, 2014

(51) Int. Cl.
| | |
|---|---|
| *G06F 15/173* | (2006.01) |
| *H04L 12/24* | (2006.01) |
| *G06F 1/26* | (2006.01) |
| *H04L 12/16* | (2006.01) |
| *G06F 3/06* | (2006.01) |
| *H04L 12/26* | (2006.01) |
| *G06F 11/20* | (2006.01) |
| *H04L 9/32* | (2006.01) |
| *G06F 3/12* | (2006.01) |

(52) U.S. Cl.
CPC ............. *H04L 41/0273* (2013.01); *G06F 1/26* (2013.01); *G06F 3/06* (2013.01); *G06F 3/12* (2013.01); *G06F 11/20* (2013.01); *G06F 15/173* (2013.01); *H04L 9/32* (2013.01); *H04L 12/16* (2013.01); *H04L 12/26* (2013.01); *H04L 41/0226* (2013.01); *H04L 41/04* (2013.01); *H04L 41/046* (2013.01); *H04L 41/0213* (2013.01)

(58) Field of Classification Search
CPC ....... H04L 12/16; H04L 41/04; H04L 41/046; H04L 12/26; H04L 9/32; G06F 15/173; G06F 3/06; G06F 1/26; G06F 3/12; G06F 11/20

USPC .......................................................... 709/223
See application file for complete search history.

(56) References Cited

U.S. PATENT DOCUMENTS

| | | | | |
|---|---|---|---|---|
| 6,704,792 | B1 * | 3/2004 | Oswald | 709/236 |
| 6,873,620 | B1 * | 3/2005 | Coveley et al. | 370/395.31 |
| 6,894,972 | B1 * | 5/2005 | Phaal | 370/229 |
| 8,255,986 | B2 * | 8/2012 | Ellis | 726/11 |

(Continued)

FOREIGN PATENT DOCUMENTS

WO    WO2009016369 A1 *    2/2009

OTHER PUBLICATIONS

"European Application Serial No. 13198205.0, Office Action mailed Apr. 21, 2015", 11 pgs.

(Continued)

*Primary Examiner* — Richard G Keehn
(74) *Attorney, Agent, or Firm* — Schwegman Lundberg & Woessner, P.A.

(57) ABSTRACT

Various embodiments herein include at least one of systems, methods, and software to connect network and system management systems. Some such embodiments include a metric message connector that obtains network entity metric messages from a first network and system management system and communicates the obtained metric message to a second network and system management system. The metric message connector may transform network entity metric messages from an original form into a different form or format, such as a form or format having meaning with the second network and system management system. The network entity metric message may be Simple Network Management Protocol messages.

20 Claims, 5 Drawing Sheets

(56) References Cited

U.S. PATENT DOCUMENTS

| | | | |
|---|---|---|---|
| 2005/0066044 A1* | 3/2005 | Chaskar | G01S 5/0205 709/230 |
| 2005/0188201 A1* | 8/2005 | Sala et al. | 713/170 |
| 2006/0031582 A1* | 2/2006 | Pugel et al. | 709/246 |
| 2007/0256080 A1* | 11/2007 | Smith et al. | 719/313 |
| 2011/0010441 A1* | 1/2011 | Gutierrez | 709/223 |
| 2011/0184969 A1* | 7/2011 | Idicula et al. | 707/760 |
| 2011/0295989 A1 | 12/2011 | Kiyoto | |
| 2012/0180120 A1* | 7/2012 | Jain | H04L 63/0245 726/11 |

OTHER PUBLICATIONS

Anonymous, "ServletRequest (Java EE 6)", http://web.archive.org/web/20111123164820/http://docs.oracle.com/javaee/6/api/javax/servlet/ServletRequest.html, (Nov. 23, 2011), 1-13.

Anyonymous, "Frame Aggregation", Wikipedia;, URL: http://en.wikipedia.org/w/index.php?title=Frame_aggregation&oldid=439795517#cite_note-cisco-1 [retrieved on Apr. 10, 2014], 1-2.

Cha, Si-Ho, et al., "Implementing an XML-Based Universal Network Management System in Java", Springer-Verlag Berlin Heidelberg, (2002), 652-661.

Neisse, Ricardo, et al., "Implementation and Bandwidth Consumption Evaluation of SNMP to Web Services Gateways", IEEE—Session Thirteen SNMP Management, (2004), 715-728.

Postel, I. J, "The TCP Maximum Segment Size and Related Topics", Network Working Group. RFC: 879, (Nov. 1983), 12 pgs.

USC, Information Sciences Institute, "Transmission Control Protocol DARPA Internet Program Protocol Specification", Defense Advanced Research Projects Agency Information Sciences Institute; XP015006775, ISSN: 0000-0003, (Sep. 1981), 1-85.

European Application Serial No. 1592204.4, Office Action mailed Feb. 12, 2016, 13 pgs.

* cited by examiner

CONNECTING NETWORK MANAGEMENT SYSTEMS

BACKGROUND INFORMATION

In today's networked computing environment, a single organization may have many networks on which many network entities, such as networked devices and systems, are connected. While many network entity monitoring tools exist, such tools need to be installed on each network to receive and monitor messages from devices on each respective network. As a result, each network is monitored separately.

Further, a network and system monitoring system may be able to receive and process messages from some, but not all network system entities. However, the organization may desire to use a single network and system monitoring system to monitor all network entity messages.

DETAILED DESCRIPTION

Figure 1:
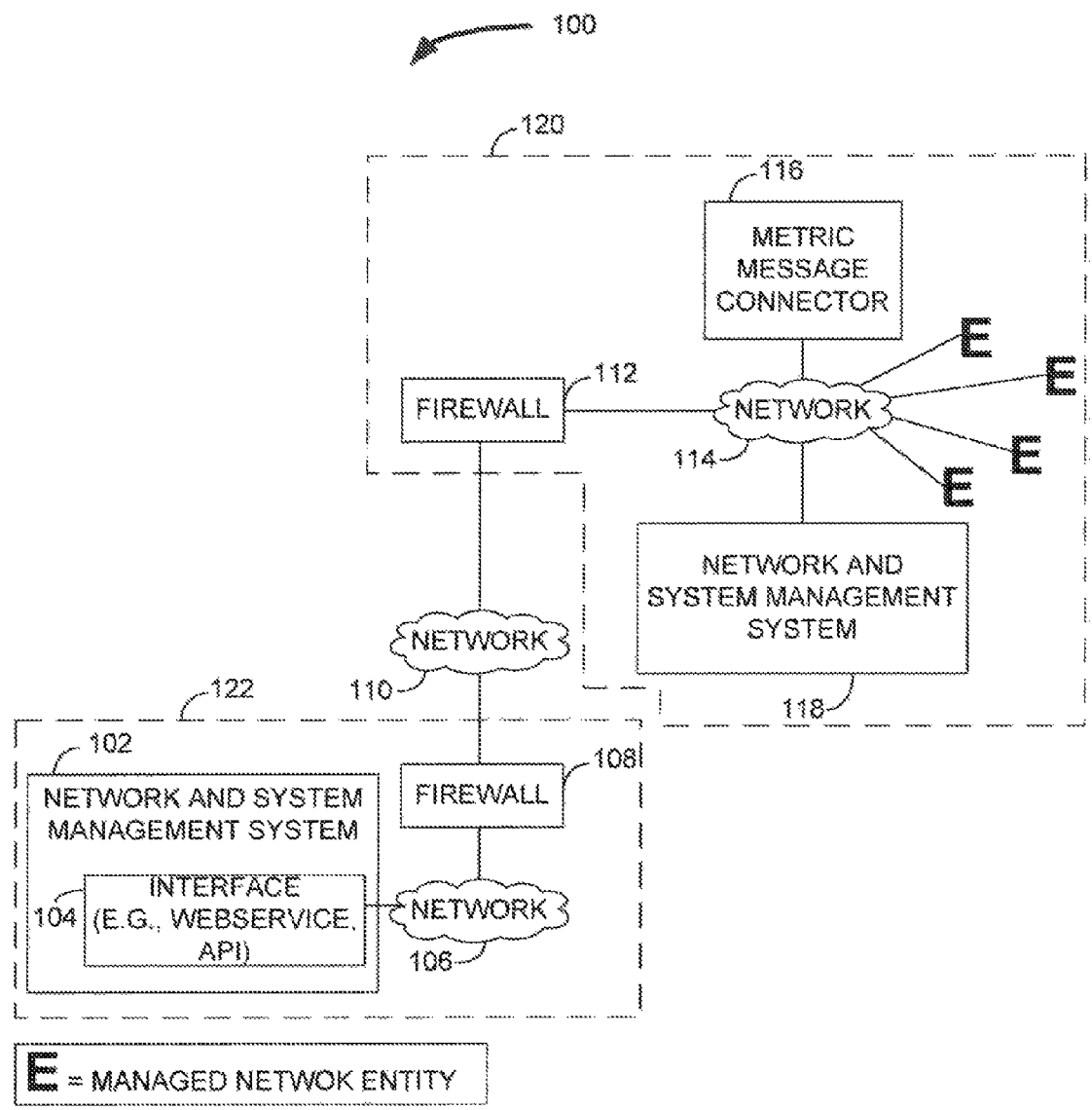
FIG. 1 is a logical block diagram of a system, according to an example embodiment.

Various embodiments herein include at least one of systems, methods, and software to connect network and system management systems, such as across disparate networks and systems on the same network that are not otherwise integrated. Some such embodiments include a metric message connector that obtains network entity metric messages from a first network and system management system that monitors a first network and communicates the obtained metric messages to a network and system management system on a second network. In other embodiments, the metric message connector communicates network entity messages generated or received in one network and system management system to another network and system management system.

The metric messages are messages transmitted on a network by network entities or generated within one system and communicated to another. A network entity is generally any device or process that reports status with regard to metrics the network entity monitors with regard to its own state. In some embodiments, network entities report their status in Simple Network Management Protocol (SNMP) messages that are broadcast on the network. Such a message broadcast by a network entity may, for example, be a network switch that monitors its network connection ports for operability, connection speed, and the like. Another network entity may be a printer that monitors its paper and toner levels. A further network entity may be a software system that monitors database latency times, connectivity with other network entities, an amount of storage space available to the software system, and other metrics.

The first network and the second network may be separate networks divided by at least one firewall. However, the first and second network may instead be separate logical networks where the second network and system monitoring system is unable to receive or process network entity metric messages that are received and processed by the first network and system monitoring system. In both such instances of networks may be separated by firewalls or logically separated networks, the first network and system monitoring system is able to provide network entity metric messages to the second network and system monitoring system to allow monitoring of network entity metric messages of the first network through the second network and system management system. Through such embodiments, as are described herein in detail with reference to the drawings, monitoring of network entities on a plurality of networks may be performed via a single network and system management system.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the cope of this application to any single invention or inventive concept if more than one is in fact disclosed.

The following description is, therefore, into to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100, according to an example embodiment. The system 100 of FIG. 1 illustrates an example embodiment including a metric message connector 116 that operates to transport metric messages from a network and system management systems 118 on one network 114 to a network and system management system 102 on a second network 106.

The network 114 is a data network that can be logically considered a network 120 that includes many elements connected thereto. Similarly, the network 106 is a data network that can be logically considered network 122, which may include many other elements connected thereto.

The network 120 includes a network and system management system 118 that receives network entity metric messages broadcast across network 114 by network entities "E". As previously briefly discussed, the network entities E are generally networked devices, processes, programs, or other hardware or software elements that monitor their own state in view of metrics and broadcast messages reporting their current state. Such messages may be broadcast by the network entities E upon occurrence of an event such as a fault, upon violation of a rule such as a configured service level agreement, on a scheduled basis, or for other reasons. These messages may be SNMP messages or other messages according to a standard or a proprietary definition. Regardless of the encoding of the messages, the messages are broadcast by the network entities E on the network 114. When broadcast across the network 114, the network entity E messages are received by the network and system management system 118.

The network and system management system 118 is a system that consumes messages broadcast by network entities E on the network 114 to which it is connected, stores data representative of the messages, provides management tools for administrators to track and handle network and network entity E conditions reported in and discovered from network entity messages, and the like. Examples of the network and system management systems 117 include Solution Manager available from SAP AG of Walldorf, Germany, Network Management Center available from Hewlett-Packard Company of Palo Alto, Calif., and Tivoli available from IBM Corporation of Armonk, N.Y. Regardless of the actual network and system management system 118 implemented, it provides a great amount of functionality for monitoring and managing components of the network 120 as whole.

The network 120 also includes a message connector 116 that operates with regard to metric messages broadcast by the network entities E on network 116. Metric messages broadcast by the network entities E on the network 114 are received and stored by the network and system management system 118. The metric message connector 116 obtains from the network and system management system 118 either the actual metric messages as broadcast by the network entities E or data representative thereof. The metric message connector 116 may retrieve the metric messages or the network and system management system 118 may push the metric message to the metric message connector 116, depending on the particular embodiment. In other embodiments, some metric messages are pushed by the network and system management system to the metric message connector 116 and others are retrieved by the metric message connector 116. The pushing and retrieving of metric messages in such embodiments may depend on configurations of the network and system management system 118 and the metric message connector 116 with regard to metric message type, state information reflected in metric messages, and network entities E from which the metric messages are received.

Regardless of how the metric messages are obtained, the metric message connector 116 may then process the metric messages. Such processing may include putting the metric messages in a suitable form for transport outside of a firewall 112 of the network 120, across another network 110 such as the Internet, and to the network and system management system 102 of network 122, which may include traversing a firewall 108 of network 122. In some embodiments, the processing of metric messages by the metric message connector 116 may include generating an extensible markup language (XML) document that encapsulates data representative of one or more metric messages. In one embodiment including generation of an XML document, the XML document may be the subject of a web service call made according to the Simple Object Access Protocol (SOAP) of a web service provided by a interface 104 of the network and system management system 102.

In other embodiments, the interface 104 is an interface to which metric message data may be transmitted by the metric message connector 116. The interface 104 in such embodiments may then generate and broadcast SNMP messages on the network 106 based on metric message data received from the metric message connector 116. Such SNMP messages may then be received by the network and system management system 102. In other embodiments, the interface 104 upon receipt of metric message data from the metric message connector 116 may instead store data in the form of SNMP messages within a metric messages data store of the network and system management system 102 where metric message data is stored when received and processed. Further detail regarding the processing of metric messages is provided below with regard to FIG. 3 and FIG. 4.

The metric message connector 116 may be a standalone software program that executes on a computer connected to the network 114. In other embodiments, the metric message connector 116 may be a module added on to another program or added to a network device that executes the metric message connector 116. In yet another embodiment, the metric message connector 116 is a hardware device including at least one network interface device, at least one processor, and at least memory device that stores instructions executable by the at least one processor to cause the hardware device to perform the functions of the metric message connector 116. In a further embodiment, the metric message connector 116 is a configurable process of the network and system management system 118.

Figure 2:
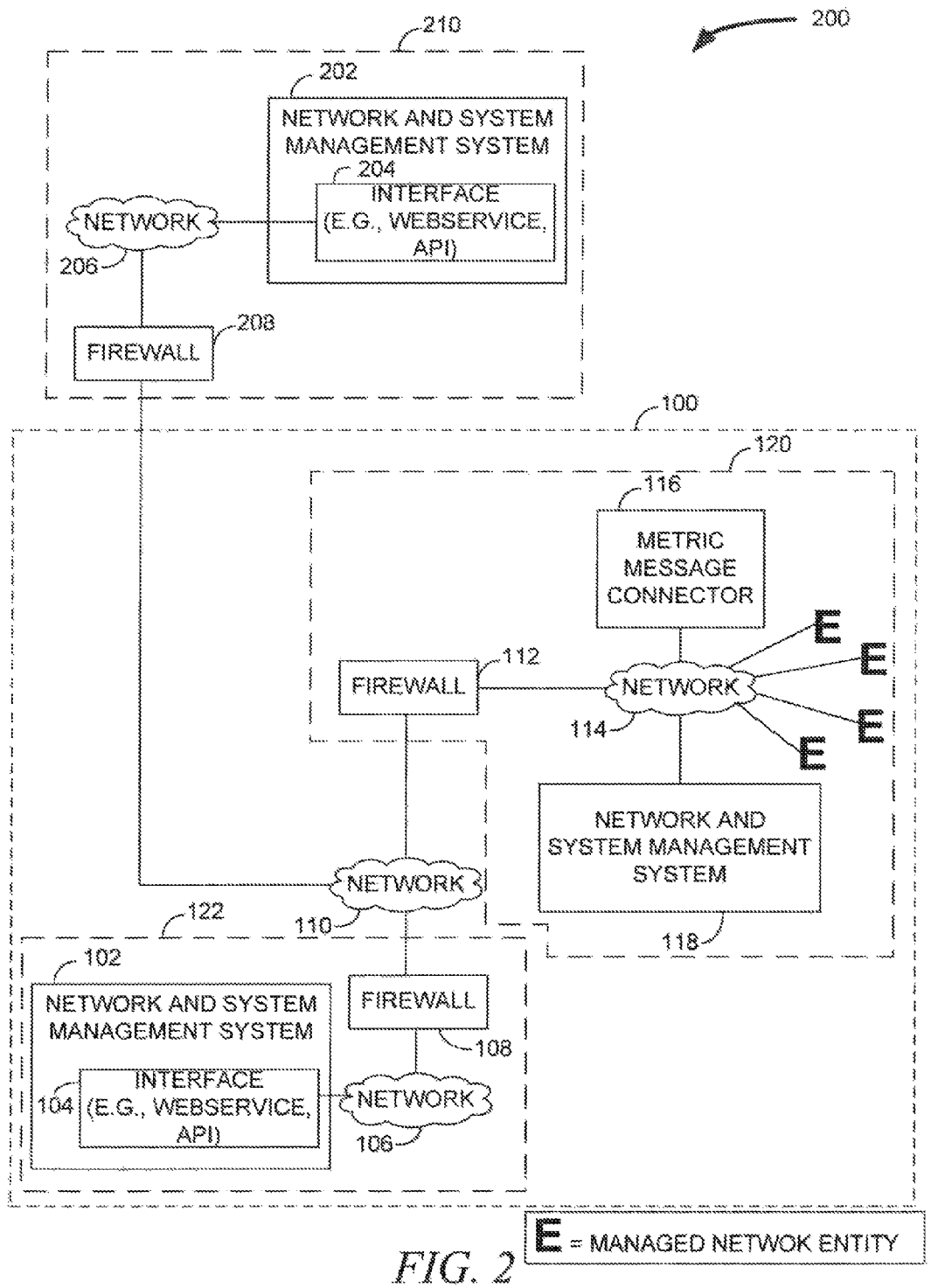
FIG. 2 is a logical block diagram of a system, according to an example embodiment.

FIG. 2 is a logical block diagram of a system 200, according to an example embodiment. The system 200 is an example of a system including not only the metric message connector 116 of network 120 that communicates network entity messages to the network and system management system 102 of network 122 as illustrated and described with regard to FIG. 1, but is also able to communicate network entity messages to another network and system management system 202 within of a network 210. The network 210 includes a network 206 that interconnects various elements of the network 210. The various elements include at least a firewall 208 and the network and system management system 202 interconnected by network 206. The network and system management system 202 may include an interface 204 that provides a channel, such as one or more web services or an application programming interfaces (API), for receiving network entity messages from the metric message connector 116 of the network 120. The system 200 therefore is generally the system 100 of FIG. 1 with the addition of the network 210.

The network and system management systems 102, 118, 210 of the networks 122, 120, 210, respectively, may be identical network and system management systems. However, in a typical embodiment, the network and system management system 118 is a distinct from the other network and system management systems 102, 202 by either version or in whole.

In some such embodiments as illustrated with regard to the system 200, the metric message connector 116 is configured to communicate certain network entity messages to the network and system management system 102 of network 122 and other network entity messages to the network and system management system 202 of network 210. Such embodiments may be implemented for various reasons. For example, one group within an organization may be responsible for monitoring and maintaining certain network entity types, such as networking devices, and another group may be responsible for monitoring and maintaining applications and application infrastructure. Each group in such an example utilizes a different instance of a network and system management system 102, 202. The metric message connector 116 is configurable to accommodate such needs and others. A particular configuration in some further embodiments is an ability to configure the metric message connector 116 to utilize different formatting and to communicate different data based on different factors. Such factors may include the network and system management system 102, 202 to which a network entity message is to be communicated, particular network entity messages received by the network and system management system 118, and the like. The configuration of the metric message connector 116 may include specifying different templates, such as XML document templates of SNMP message types and formats, from which communications to the network and system management systems 102, 202 are generated.

Figure 3:
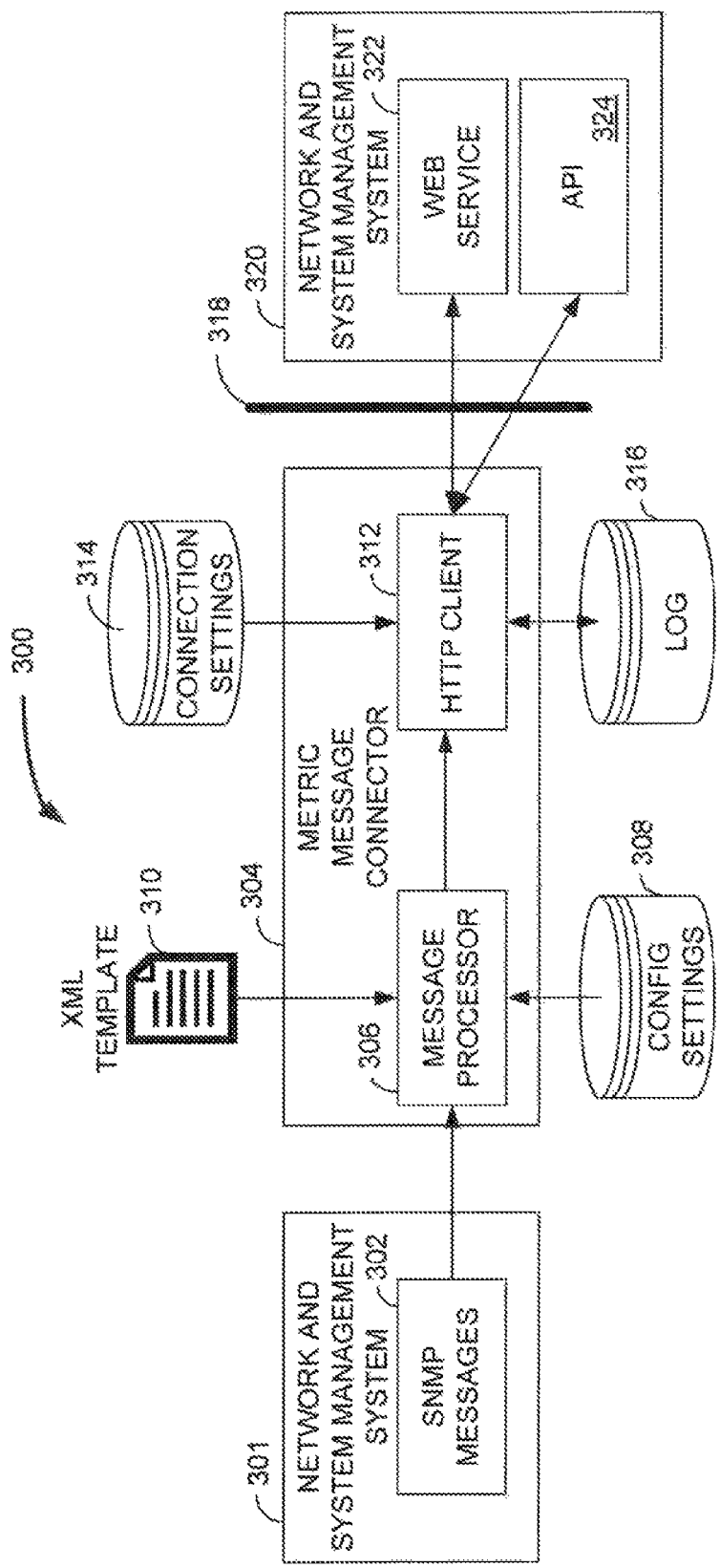
FIG. 3 is a logical block diagram of a system, according to an example embodiment.

FIG. 3 is a logical block diagram of a system 300, according to an example embodiment. The system 300 illustrates a flow of network entity messages, such as SNMP messages, from a network and system management system 301 to another network and system management system 320.

The system 300 includes the network and system management system 301 that receives network entity messages over a network, such as a local area network (LAN). The network entity messages in this embodiment are SNMP messages 302 or data from which SNMP messages may be generated. The system 300 also includes a metric message connector 304.

The metric message connector 304 is typically present on the same network as the network and system management system 301, such as the same LAN. However, in some embodiments, the metric message connector 304 may be an object that provides metric message generation services to the network and system management system 301 or another software system, such as an application or enterprise-class application such as an Enterprise Resource Planning (ERP) application. The metric message connector 304 either receives the SNMP messages 302, or data from which SNMP messages or other network entity messages can be generated, when pushed by the network and system management system 302 or when retrieved by a message processor 306 of the metric message connector 304 or other process thereof. The message processor 306 processes the SNMP messages, or data from which SNMP messages or other network entity messages can be generated, in view of stored configuration settings 308 and a document template, such as an XML document template 310 or another data structure including data defining a form for one or more message types.

The configuration settings 308 may define SNMP messages or other data of interest that are to be processed and other SNMP messages or other data that are to be ignored. The configuration settings 308 may further include data translation mappings that map SNMP message data or other data values to values of the network and system management system 320 to which SNMP messages are to be transmitted. For example, one such mapping may convert an SNMP message value "CRITICAL" to a number "9" which has an equivalent meaning within the network and system management system 320. Another such mapping may map message data from a particular system to a value identifying that particular system within the network and system management system 320. The configuration settings 308 may further identify the network and system management system 320 as the destination to which the SNMP messages, or other data from which SNMP messages can be generated, are to be transmitted.

The XML document template 310 may be a template adapted to a form that may be transmitted in a call of a web service 322 of the network and system management system 320. For example, the XML template 310 may be a template for generation of an XML SOAP request. The XML template 310 may include fields with defined placeholders that the message processor 306 can search for in the XML template 310 and replace with data of an SNMP message and any data translated according to the configuration settings 308.

The message processor 306 may process one SNMP message at a time and generate an XML document, or other data structure, for each SNMP message or other data from which an SNMP message can be generated. In other embodiments, the message processor 306 may process several SNMP messages at a time to generate one XML document containing data of or representative of the several SNMP messages. Regardless of whether the XML document includes data of one or many SNMP messages, the message processor 306 forward the XML document to a transmission client, such as the HTTP client, transmit the XML document to the Network and system management system.

In another embodiment, the message processor 306, which processing messages other than SNMP messages such as proprietary metric messages received within the network and system management system 301, may receive or retrieve data representative of the proprietary metric messages. The message processor 306 may then generate a message in a form to be transmitted to the network and system management system 302 according to at least the configuration settings 308. The message processor 306 may further utilize one or more other message templates, such as templates for generation of SNMP messages or API 324 calls to an interface of the network and system management system 320 other than a web service 322 call. Regardless of the message type generated for transmission to the network and system management system 320, the generated message may then be forwarded to a transmission client, such as the HTTP client 312 or other client depending on a protocol through which the particular message is to be transmitted.

The transmission client, such as the HTTP 312, operates to communicate the received message, such as an XML document or other message, which may be an XML SOAP request or API call, to the network and system management system 120. In particular, the HTTP client 312, according to the example system 300, operates to communicate the XML document to the network and system management system 320 by making a web service 322 call. The HTTP client 312, in making the web service 322 call, establishes or utilizes an existing network connection as defined within stored connection settings 314. The connection settings may identify various connection parameters, such as network ports to utilize Internet Protocol (IP) addresses, firewall permissions, and the like. The HTTP client 312 utilizing such a defined connection then transmits the XML document to the web service 322. The transmission of the XML document may include a SOAP request. The web service 322 in such embodiments, upon receipt, processes the XML document to provide the data contained therein to the network and system management system 320. In embodiments where the message to be transmitted is not an XML document, the connections may be established and utilized in a similar manner, although rather than making a web service call, the call will be to an API or other data processing entity of the network and system management system 320 of a network entity on a network to which the network and system management system 320 is connected.

In some embodiments, the HTTP client 312, prior to transmitting the XML document or other message type to the network and system management system 320, writes the XML document or other message type to a log 316. The log 316 is generally a data storage device local to a network to which the metric message connector 304 is connected. Upon successful transmission to the network and system management system 320, the HTTP client 312 may delete the XML document or other message from the log 316. However, in some embodiments, the XML document or other message may remain in the log 316 indefinitely, for a defined period (i.e., a number of minutes, hours, or days) and be purged by a garbage collection process.

In some embodiments, the HTTP client 312 in transmitting the XML document or other message to the network and system management system is performed across one or more firewalls 318 or other network barriers. The HTTP client 312 in transmitting via HTTP is able to traverse such firewalls 318. Other modes of communication, messaging, and delivery modes may be used in other embodiments to traverse such firewalls 318 with data representative of the SNMP messages. For example, some embodiments include an API call, a file stored to a designated network storage location accessible by a process of the network and system management system data structure transmitted via a value added network, or other message and message transmission scheme.

Figure 4:
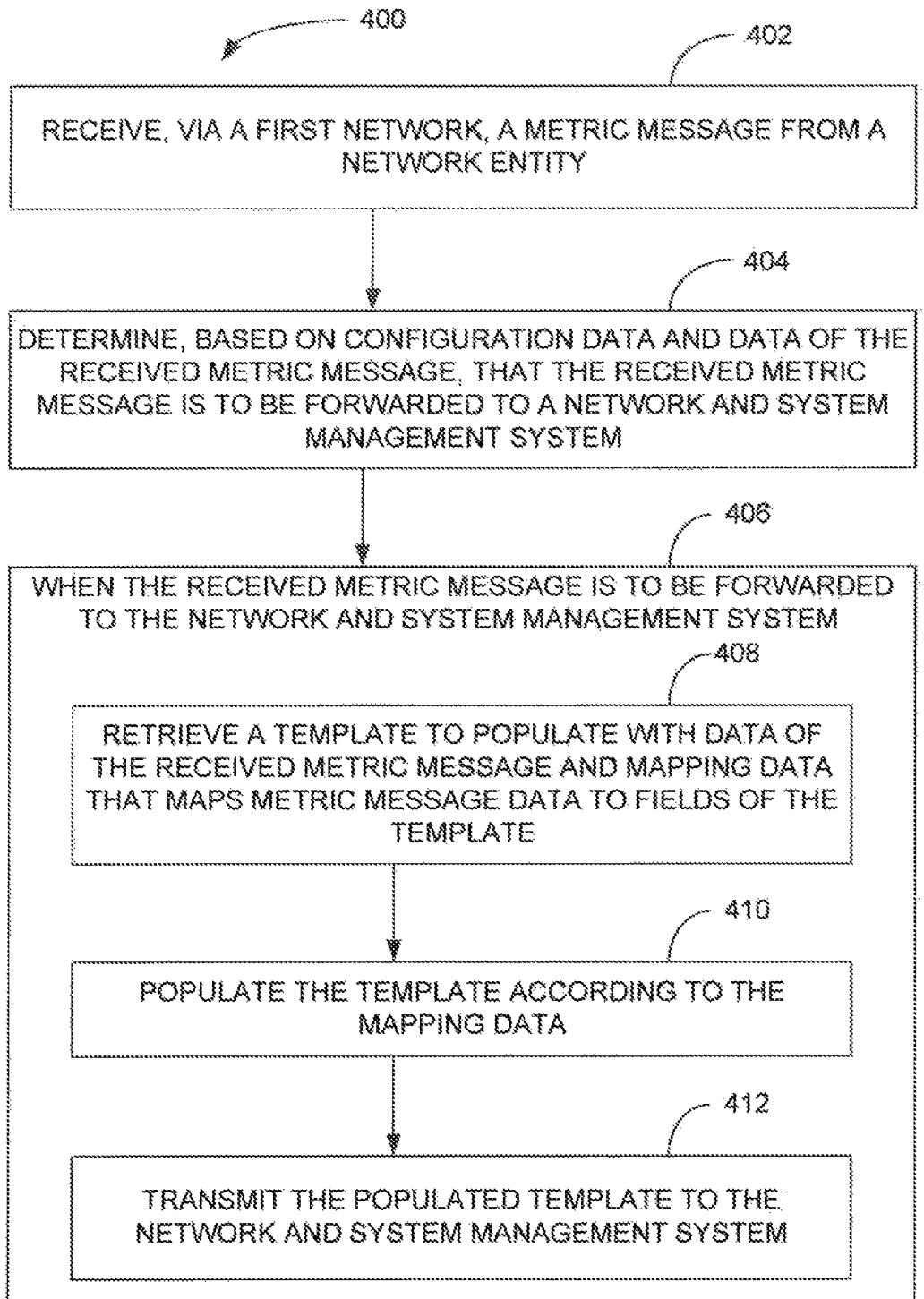
FIG. 4 is a block flow diagram of a method, according to an example embodiment.

FIG. 4 is a block flow diagram of a method 400, according to an example embodiment. The method 400 is an example of a method that may be performed, for example by a metric message connector 116 of FIG. 1 and FIG. 2 and 304 of FIG. 3. In some other embodiments, the method 400 may be performed in whole or part by one or more processes of a network and system management system or a combination of a network and system management system and a metric message connector.

The example method 400 includes receiving 402, via a first network a metric message, such as an SNMP message, from a network entity and determining 404, based on configuration data and data of the received metric message, that the received metric message is to be forwarded to a network and system management system on a second network. In a typical embodiment, the metric message received 402 from a network entity is received indirectly via a network and system management system on the first network which is distinct from the network and system management system to which the method 400 transmits 412 the populated 410 template, described below.

In such embodiments, when the received metric message is to be forwarded to the network and system management system on a second network 406, the method 400 includes retrieving 408 a template to populate with data of the received metric message and mapping data that maps metric message data to fields of the template. The method 400 then populates 410 the template according to the mapping data. Once populated 410, the populated 410 template may then be transmitted 412, via the first network to the second network, to the second network and system management system.

In some embodiments of the method 400, the template is an extensible markup language (XML) template. In such embodiment transmitting 412 the populated 410 template includes transmitting 412 the XML template in a Simple Object Access Protocol (SOAP) message to a web service providing at least one messaging service with regard to the network and system management system.

In another embodiment of the method 400, prior to transmitting 412 the populated 410 template to the network and system management system, the populated 410 is stored to local data storage. Subsequently, method 400 in such embodiments includes receiving a confirmation at the populated 410 template was received by the network and system management system and then deleting the populated 410 template from the local data storage. Local data storage in such embodiments may be local to a computing device performing the method 400, but may also be local in the sense that the local storage is accessible via a local network, such as a LAN.

In some other embodiments, prior to transmitting 412 the populated 410 template to the network and system management system, the method 400 further includes storing the populated 410 template to a local data storage and periodically retrieving a plurality of populated 410 templates from the local data storage. Again, local data storage in such embodiments may be local to a computing device performing the method 400, but may also be local in the sense that the local storage is accessible via a local network, such as a LAN. The method 400 may then aggregate the retrieved populated 410 templates into a single data structure. In such embodiments, the transmitting 412 of the populated template includes transmitting 412 the single data structure to the network and system management system.

Figure 5:
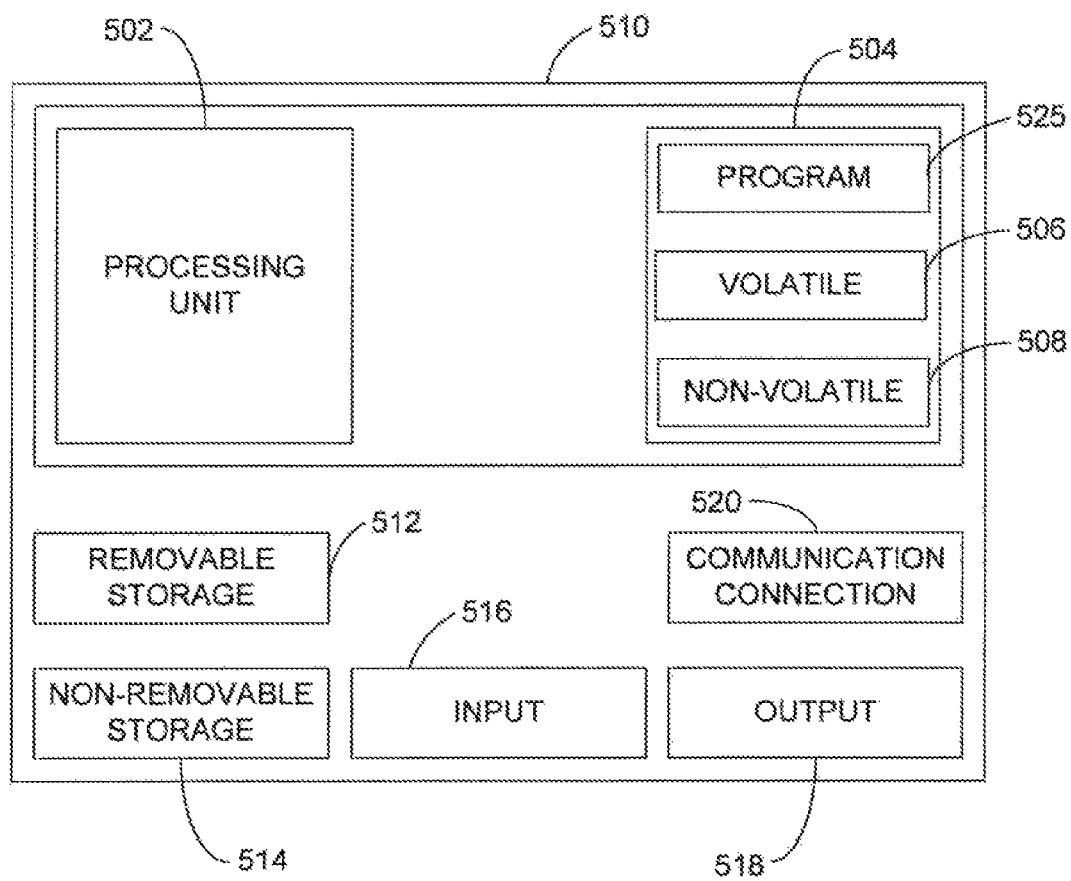
FIG. 5 is a block diagram of a computing device, according to an example embodiment.

FIG. 5 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Another embodiment is in the form of a system that may be implemented on one or more computers, such as computer 510. Such a system includes at least one processor, at least one memory device, and at least one network interface device. The system further includes a first network and system management system stored on the at least one memory device and executable by the at least one processor to receive metric messages broadcast on a network by network entities. The system further includes a metric message connector module stored on the at least one memory device and executable by the at least one processor.

The metric message connector module is executable by the at least one processor, in some embodiments, to perform different data processing tasks. Such data processing tasks may include processing metric messages received by the first network and system management system to identify, based on configuration data and data of the received metric messages, metric messages to be forwarded to a second network and system management system on a second network. Further, for each received metric message identified to be forwarded to the second network and system management system, the metric message connector module may perform additional data processing tasks.

The addition data processing tasks of the metric message connector module, with regard to each metric message identified to be forwarded to the second network and system management system may include retrieving, from the at least one memory device, an XML template to populate with data of the identified metric message and mapping data that maps metric message data to fields of the XML template. The metric message connector module may then populate the XML template with data of the identified metric message according to the mapping data. Once the XML template is populated, the metric message connector module may then transmit, via the at least one network interface device encoded within a SOAP message, the populated XML template to the second network and system management system on the second network.

Computer-readable instructions stored on a computer-readable medium are executable by the processing unit 502 of the computer 510. A hard drive, CD-ROM, and RAM are some examples of articles including a non-transitory computer-readable medium. For example, a computer program 525 capable of performing one or more of the methods illustrated and described herein may be stored on a non-transitory computer-readable medium, such as a metric message connector 304 of FIG. 3.

Another embodiment is in the form of a method. The method in such an embodiment includes receiving, via a network, a metric message from a first network and system management system. The metric message may be received in a standards based format or in a format of the first network and system management system that is different than a format of a second network and system management system to which a representation of the received message is to be transmitted. The formats of the first and second network and system management systems may be proprietary to their respective systems. However, in other embodiments, the formats of the first and second network and system management systems may actually be identical.

This method further includes determining, based on configuration data and data of the received metric message, that the received metric message is to be forwarded to the second network and system management system. When the received metric message is to be forwarded to the second network and system management system, the method includes identifying a format for transmitting data of the received metric message to the second network and system management system. In some such embodiments, the identified format is a format of a simple network management protocol message.

The method may the generate a message including data representative of the received metric message according to the identified format for transmitting to the second network and system management system. The generated message may then be transmitted, via the network, to the second network and system management system. Transmitting the generated message may include transmitting the generated message via the network in an API call to an API of the second network and system management system.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
receiving, at a first network and system management system on a first network, a plurality of metric messages from a network entity configured to monitor a state of metrics of the network entity and broadcast messages reporting a current state of metrics;
for each metric message of the plurality of metric messages,
analyzing by the first network and system management system, configuration data and data of the metric messages received from the network entity to determine a network system and management system to which to forward the metric message;
determining, by the first network and system management system, based on the configuration data and data of the metric message received from the network entity, that the received metric message is to be forwarded to a second network and system management system on a second network, the second network distinct from the first network, the second network and system management system unable to receive or process network metric messages that are received and processed by the first network and system management system;
determining, by the first network and system management system, from more than one different template, a template identified in the configuration data for the second network system and management system to populate with data of the metric message received from the network entity;
retrieving, by the first network and system management system, the template to populate with data of the metric message received from the network entity, and mapping metric message data to fields of the template;
populating, by the first network and system management system, the template according to the mapping data;
storing, by the first network and system management system, the template to a local data storage;
retrieving, by the first network and system management system, a plurality of populated templates from the local data storage to be transmitted to the second network system and management system;
aggregating, by the first network and system management system, the retrieved populated templates into a single data structure; and
transmitting, by the first network and system management system, the single data structure to the second network and system management system.

2. The method of claim 1, wherein:
the template is an extensible markup language (XML) template; and
transmitting the single data structure includes transmitting the single data structure in a Simple Object Access Protocol (SOAP) message to a web service providing at least one messaging service with regard to the second network and system management system.

3. The method of claim 1, wherein the metric message is a Simple Network Management Protocol (SNMP) message.

4. The method of claim 1, further comprising:
receiving a confirmation that the single data structure was received by the second network and system management system; and
deleting the plurality of templates of populated templates that were aggregated into the single data structure from the local data storage.

5. The method of claim 1, wherein the first and second networks are separated by at least one firewall.

6. The method of claim 1, wherein the configuration data:
includes connectivity information to connect with the second network and system management system.

7. The method of claim 1 wherein the single data structure is transmitted outside of a firewall of the first network and traverses a firewall of the second network.

8. The method of claim 1 wherein transmitting the single data structure is performed across one or more firewalls or other network barriers.

9. The method of claim 1, wherein the configuration data defines data of interest in metric messages that is to be processed and data in metric messages that are to be ignored.

10. The method of claim 9, wherein populating the template according to mapping data includes populating the template according to data of interest that is to be processed and ignoring data that is to be ignored.

11. The method of claim 1, further comprising:
determining, by the first network and system management system, translation mappings identified in the configuration data that map the data of the metric message to values of the second network and system management system.

12. A non-transitory computer-readable medium, comprising instructions stored thereon that are executable by at least one processor of at least one computing device cause the at least one computing device to:
receive, via a first network, a plurality of metric messages from a first network and system management system;
for each metric message of the plurality of metric messages,
determine, based on configuration data and data of the received metric message, that the received metric message is to be forwarded to a second network and system management system on a second network, the second network distinct from the first network, the second network and system management system unable to receive or process metric messages that are received and processed by the first network and system management system;
determine, from more than one different template, a template identified in the configuration data for the second network system and management system to populate with data of the metric message received from the network entity;
populate the template with data of the metric message received from the network entity and store the template to a data storage;
retrieve a plurality of populated templates from the data storage to be transmitted to the second network system and management system;
aggregate the retrieved populated templates into a single data structure; and
transmit; via the network; the single data structure to the second network and system management system.

13. The non-transitory computer-readable medium of claim 12, wherein:
transmitting the single data structure includes transmitting the single data structure via the network in an application programming interface call to an application programming interface of the second network and system management system.

14. The non-transitory computer-readable medium of claim 12; wherein the metric message is a message received in proprietary format of the first network and system management system that is different from a format of the second network and system management system.

15. The non-transitory computer-readable medium of claim 12, wherein the instructions are further executable to cause the at least one computing device to:
receive a confirmation that the single data structure was received by the second network and system management system; and
delete the plurality of templates of populated templates that were aggregated into the single data structure from the local data storage.

16. The non-transitory computer-readable medium of claim 12, wherein the configuration data:
defines the format for transmitting data of the received metric message to the second network and system management system and provides the mappings of metric message data to fields of the defined format; and
includes connectivity information to connect with the second network and system management system.

17. A system comprising:
at least one processor, at least one memory device, and at least one network interface device; and
a first network and system management system stored on the at least one memory device and executable by the at least one processor to receive metric messages broadcast on a first network by network entities configured to monitor a state of metrics of network entities and broadcast messages reporting a current state of metrics;
a metric message connector module stored on the at least one memory device and executable by the at least one processor to:
process metric messages received by the first network and system management system to identify, based on configuration data and data of the received metric messages, metric messages to be forwarded to a second network and system management system on a second network, the second network distinct from the first network, the second network and system management system unable to receive or process network metric messages that are received and processed by the first network and system management system; and
for each received metric message identified to be forwarded to the second network and system management system:
determine, from more than one different template, a template identified in the configuration data for the second network system and management system to populate with data of the metric message received from the network entity;
retrieve, from the at least one memory device, the template to populate with data of the identified metric message received from the first network and system management system and mapping data that maps metric message data of the received metric message to fields of the template;
populate the template with data of the identified metric message according to the mapping data;
retrieve a plurality of populated templates from the data storage to be transmitted to the second network system and management system;

aggregate the retrieved populated templates into a single data structure; and transmit, via the at least one network interface device, the single data structure to the second network and system management system on the second network.

18. The system of claim 17, wherein the metric messages are Simple Network Management Protocol (SNMP) messages.

19. The system of claim 17, wherein the metric message connector module is further executable by the at least one processor to:

receive a confirmation that the single data structure was received by the second network and system management system; and delete the plurality of templates of populated templates that were aggregated into the single data structure from the at least one memory device.

20. The system of claim 17, wherein the configuration data:
includes connectivity information to connect with the second network and system management system on the second network.

* * * * *